Patented Aug. 15, 1933

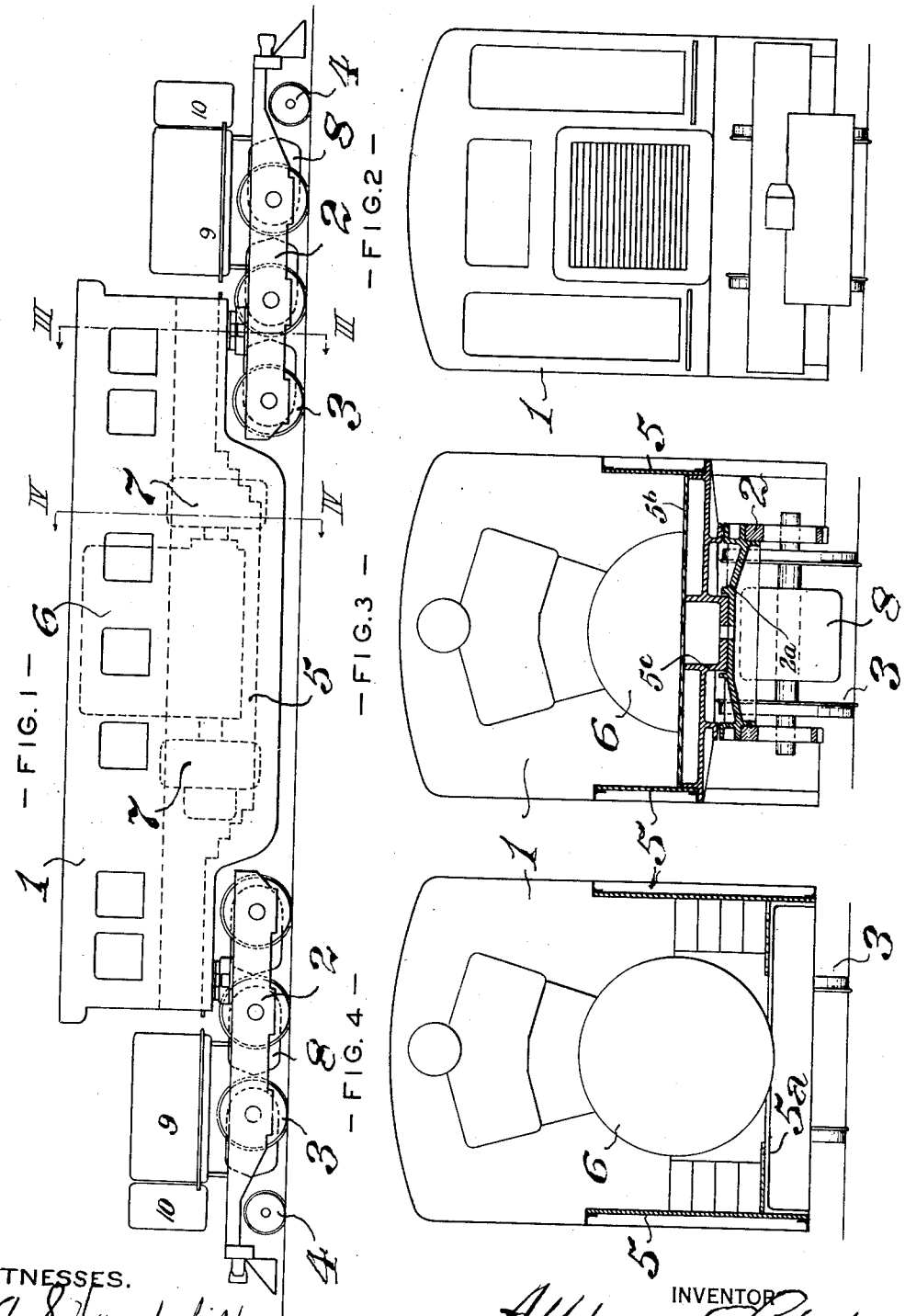

1,922,896

UNITED STATES PATENT OFFICE 1,922,896

HIGH POWERED INTERNAL COMBUSTION ENGINE LOCOMOTIVE

Alphonse Lipetz, Saratoga Springs, N. Y.

Application July 27, 1928. Serial No. 295,647

1 Claim. (Cl. 105—35)

This invention relates, generally, to locomotives which are propelled by Diesel or other internal combustion engines, operatively connected to the driving wheels by an intermediate transmission means, and particularly relates to the support and disposition of the prime mover and associated mechanisms. The object of the invention is to provide means whereby Diesel or other internal combustion engines, of greater dimensions and higher power than those heretofore applied in practice, may be made available without increase of the height of the locomotive structure, and with the capacity of more substantial support, and more ready accessibility to the working members.

The improvement claimed is hereinafter fully set forth.

In the accompanying drawing: Figure 1 is a side view, in elevation, of an internal combustion engine locomotive, illustrating an embodiment of the invention; Fig. 2, an end view, in elevation, of the same, and, Figs. 3 and 4, vertical transverse sections, on the lines III—III and IV—IV, respectively, of Fig. 1.

In the practice of the invention, referring descriptively to the specific embodiment thereof which is herein exemplified, a main body, constituting a cab, 1, is supported, pivotally, adjacent to its ends, on trucks, 2, 2, each of which is carried on a wheel arrangement of any suitable and preferred description. In the instance shown, the wheel arrangement of each truck comprehends three pairs of driving wheels, 3, and one pair of truck or guiding wheels, 4, but such arrangement is not an esssential of the invention, and may be varied, in the discretion of the constructor, without departure therefrom.

The frame of the cab, 1, of the locomotive comprises two vertical side members, 5, 5, which are metal plates of substantial strength and rigidity, extending along the sides of the cab, and connected, at suitable intervals, by cross tie members, 5a and 5b. The end portions of the side members stand above the trucks, 2, 2, a sufficient distance to permit the insertion of cross tie members, 5b carrying the centre pins, 5c, which engage the center plates, 2a, of the trucks. The cab structure is thus pivotally supported on the trucks, and acts as a connecting draw bar between the same. The bottoms of the intermediate portions of the side members, together with the flooring thereon, are depressed to as low a level as is possible while leaving the necessary clearance above the rails of the track on which the locomotive operates. It will be seen that if the height of the cab remains the same as in present practice, this depression at the intermediate portions of the cab, correspondingly increases the volume of the interior thereof and the vertical space available for the location of the Diesel engines and generators therein.

A Diesel or other engine, 6, of proper size and power, is installed in the depressed portion of the cab, said engine delivering its power to the preferred and selected transmission means. Said means may, as in the instance exemplified, comprise generators, 7, from which current is transmitted to motors, 8, each of which is carried on an axle of one of the pairs of driving wheels, 3, of a truck, 2, or may be a pump, whereby fluid under pressure is supplied to hydraulic motors, similarly associated with the driving wheels, or an air compressor, compressing air into storage reservoirs, mounted within the cab structure, or on the superstructure of the trucks, from which reservoir, air is conveyed, by suitable conduits, to motor means, mounted on the trucks, and adapted to rotate the driving wheels.

Another method of transferring the power of the engine to the driving wheels may be comprised in an organization of variable speed gearing, or gear-box containing a plurality of gear wheels and shafts associated therewith, and capable of permutable interconnection by means of mechanical or electrical clutches or permutation means, so that the relative rotational speed of the engine shaft and the delivery shaft may be varied at will, said delivery shaft from the gear box being operatively associated with the driver by any suitable means; such as flexibly jointed shafts and their associated gear wheels, carried in part on the cab structure and in part on the structure of the truck.

A structural modification may be desirable, in which the side members, 5, of the frame of the cab, the cross ties, 5a and 5b, thereof, the centre pins 5c, and the lower portion of the engine bed, are combined in a unitary structure, such as a steel casting, whereby the assemblage of the locomotive may be facilitated, and the maximum of overhead room be afforded for the engine.

The adaptability of application of an engine of materially increased size and power, in the increased space afforded by the depression of the cab, between the trucks, will be obvious as will be the substantial advantage of such application.

In locomotives of very great capacity there may not be sufficient room in the cab for all the auxiliary apparatus required for the proper utilization of the locomotive as a whole; in which case such auxiliary elements may be mounted directly on the structure of the trucks, forward or rearward of the portion of the truck structure on which the center-bearings for supporting the ends of the cab structure are attached.

Such auxiliary apparatus is illustrated at 9 and 10 and comprises tanks and radiators for the cooling water for the main engine; tanks for the fuel supply for the same; air compressors actuated by motors or small internal combustion engines; small generators of electrical energy driven by internal combustion engines or other means; apparatus for applying sand to the track by mechanical, pneumatic, or electrical means; means for actuating brushes adapted to cleanse and polish the surface of the rail coacting with the driving wheels to produce traction, and all other auxiliary apparatus that cannot be accommodated within the cab.

The invention claimed and desired to be secured by Letters Patent, is:

In a locomotive, the combination of a pair of trucks; a cab structure pivotally mounted on said trucks, said structure terminating short at at least one of its ends on the adjacent truck to provide a usable space on said truck beyond the end of said cab structure, the intermediate portion of said cab structure between the trucks having a supporting floor disposed below the upper level of said trucks to provide a substantially increased vertical space within said cab structure; an internal combustion engine of a height greater than the vertical space adjacent to the ends of said intermediate portion supported on said floor in said increased space; and an electric generator operatively connected with said engine, disposed on each side of said engine, and supported on said floor in said increased space.

ALPHONSE LIPETZ.